United States Patent [19]

Schulz et al.

[11] Patent Number: 4,560,710

[45] Date of Patent: Dec. 24, 1985

[54] DRAG REDUCTION AGENT

[75] Inventors: Donald N. Schulz, Annandale; Dennis G. Peiffer, East Brunswick; Ralph M. Kowalik, Bridgewater; Jeffrey J. Kaladas, South Bound Brook, all of N.J.

[73] Assignee: Exxon Research and Engineering Co., Florham Park, N.J.

[21] Appl. No.: 688,235

[22] Filed: Jan. 2, 1985

[51] Int. Cl.⁴ .............................................. B05D 5/08
[52] U.S. Cl. .................................. 523/175; 526/287; 526/288; 526/307.3
[58] Field of Search ............... 526/287, 288, 307.3; 523/175

[56] References Cited

U.S. PATENT DOCUMENTS

| | | | |
|---|---|---|---|
| 4,075,183 | 2/1978 | Kawakami et al. | 526/307.3 |
| 4,460,758 | 7/1984 | Peiffer et al. | 526/287 |
| 4,489,180 | 12/1984 | Lundberg et al. | 523/175 |

FOREIGN PATENT DOCUMENTS

| | | | |
|---|---|---|---|
| 0024012 | 2/1981 | European Pat. Off. | 526/287 |
| 1207630 | 12/1965 | Fed. Rep. of Germany . | |

OTHER PUBLICATIONS

Poly(sulphopropylbetaines): Synthesis and Characterization, V. M. Monroy Soto and J. C. Galin, Polymer, 1984, vol. 25, Jan.

Primary Examiner—Joseph L. Schofer
Assistant Examiner—J. M. Reddick
Attorney, Agent, or Firm—Richard E. Nanfeldt

[57] ABSTRACT

A method for reducing the frictional drag of an aqueous solution flowing through a pipe, tube or conduit having a continuous flow therethrough, which comprises the step of adding about 0.001 to about 0.1 wt. % of a copolymer to said aqueous solution, wherein said copolymer has the structure:

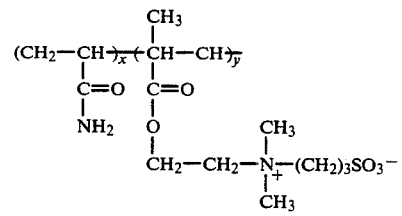

wherein $x$ is about 40 to about 99 mole % and $y$ is about 1 to about 60 mole %.

3 Claims, 1 Drawing Figure

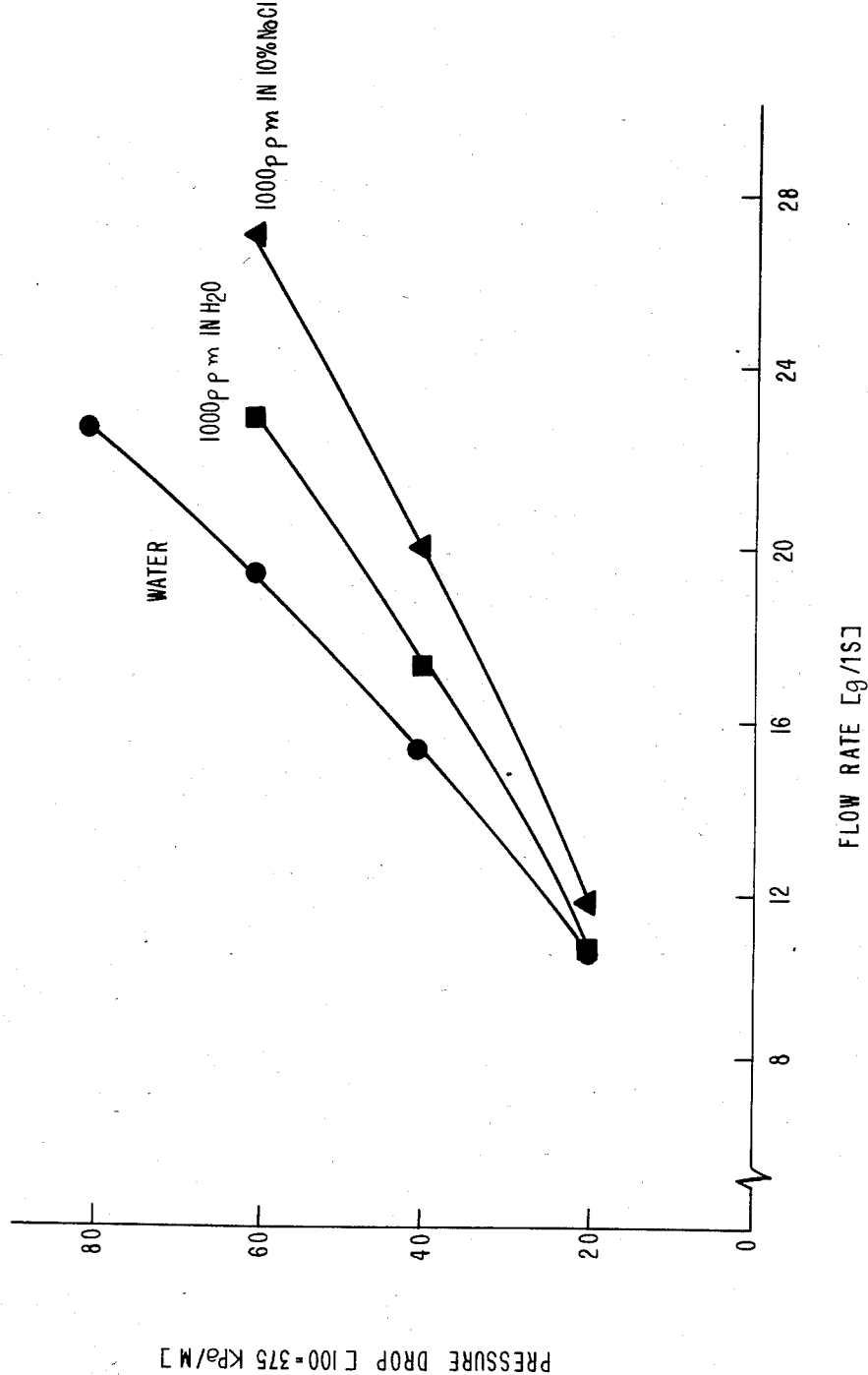

DRAG REDUCTION AGENT

FIELD OF THE INVENTION

To flow liquids in pipes, energy must be expended to overcome frictional losses. This energy is extracted from the liquid pressure, which decreases along the pipe in the direction of flow. For a fixed pipe diameter, these pressure drops increase with increasing flow rate until a maximum is reached when the pressure drop along the pipe equals the supply pressure at the beginning of the pipe. When flow in the pipe is turbulent (flow Reynolds number=mean fluid velocity×pipe diameter−fluid kinematic viscosity greater than about 2000) this maximum flow rate can be increased by the addition of small amounts of certain high molecular weight linear polymers to the liquid. These polymers interact with the turbulent flow processes and reduce frictional pressure losses such that the pressure drop for a given flow rate is less, or the maximum flow rate for a given pressure drop is larger. This phenomenon is commonly called drag reduction. It has been used in commercial oil pipelines, fire hoses and storm sewers to increase the flow capacities of existing systems. It can also be used to reduce supply pressures, pumping costs, and/or pipe diameters for given flow capacities.

BACKGROUND OF THE INVENTION

The present invention discloses a class of water soluble betaine copolymers which have been found to be improved drag reducing agents, especially in brine or acid solutions. These betaine copolymers are copolymers of acrylamide and N-(3 sulfopropyl)-N-methacrolyoxyethyl-N, N-dimethyl-ammonium betaine.

The betaines are a special class of zwitterions. These materials are self-neutralized and contain no counterions. Moreover, the positive and negative charges are separated by alkyl groups.

Carboxymethacrylate betaine monomers (I) and polymers (II) are well-known and disclosed in U.S. Pat. No. 2,777,872 (Jan. 15, 1957), U.S. Pat. No. 2,834,758 (May 13, 1958) and U.S. Pat. No. 2,846,417 (Aug. 5, 1958).

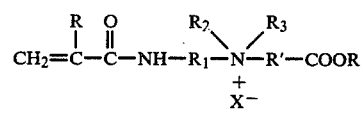

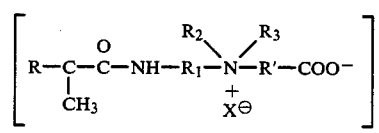

Carboxyvinylpyridine betaine monomers and homopolymers (III) have also reported [H. Ladenheim and H. Morowetz, J. Poly. Sci. 26, 251 (1957)].

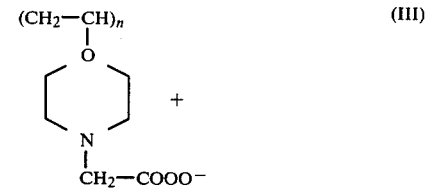

Sulfovinylpyridine betaine monomers and homopolymers (IV) and acrylamide copolymers are known [R. Hart and D. Timmerman, J. Poly, Sci. 28, 118 (1958)].

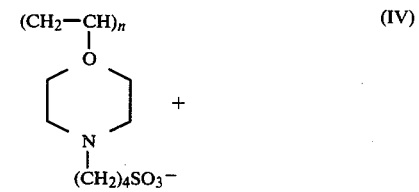

The butylsulfobetaine of poly(2-vinylpyridine) is soluble in water, but the butylsulfobetaine of poly(4-vinylpyridine) is not. Both betaines are soluble in salt solution.

N-(3-sulfopropyl)-N-methacroyl-oxyethyl-N-N-dimethyl-ammonium betaine monomer and copolymer with acrylamide are disclosed in Ger. Auslegeschrift No. 1207630 for use as a viscosifier. The monomer and homopolymers are also reported in Polymer 25 121,254 (1984).

More recently, reports of vinylimidazolium sulfobetaine homopolymers (V) have appeared [J. C. Salamone, et al Polymer 18, 1058 (1977); Polymer 19, 1157 (1978)]

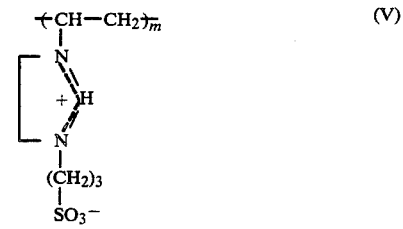

These homopolymers are insoluble in water, but soluble in certain salt solutions. In contrast to normal polyelectrolytes, the reduced viscosity of the soluble imidazolium sulfobetaine polymers increases with increasing salt concentration.

SUMMARY OF THE INVENTION

The present invention relates to improved drag reducing agents which are betaine copolymers which are copolymers of acrylamide and N-(3 sulfopropyl)-N-methacroyloxyethyl-N, N-dimethyl-ammonium betaine (VI). Such polymers contain both positive and negative charges.

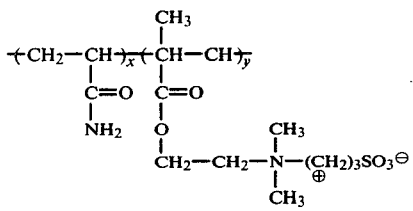

wherein x is about 40 to about 99 mole % and y is about 1 to about 60 mole %.

The present invention is distinguished from the carboxymethacrylate betaine homopolymers and copolymers (U.S. Pat. Nos. 2,777,872, 2,834,758, and 2,846,417) because sulfonate vs. carboxylate anions and low vs. high charge densities are used. Furthermore, carboxylate anions are limited by their known susceptibility to precipitation by polyvalent cations (e.g. $Ca^{++}$); the latter species are often found in geological formations and sea water. [F. J. Glaris in "Water Soluble Resins" 2nd Ed, R. L. Davidson and M Sittig, Eds. Rheinhold, NY, p. 168]. Consequently, carbonyl betaines would have limited utility as drag reducing agents in sea water. Sulfonate anions re not so limited.

The present invention is distinguished from the previous sulfobetaine work in the following ways: different structures, lower charge density and higher viscosities than the Ladenheium, Morawetz art; different structures, lower charge density and high viscosities than the Hart and Timmerman work; and different structures, lower charge densities and higher viscosities than the Salamone art. In addition, the instant copolymers are soluble both in water and high concentrations of salts, unlike most of the polymers of the prior art. Finally, the instant invention is distinguished from the sulfobetaine work of Ger. Anslegeschrift No. 1,207,603 and other sulfobetaine work because it relates to a drag reduction rather than a viscosification process.

GENERAL DESCRIPTION OF THE INVENTION

The present invention relates to a method for reducing the frictional drag of an aqueous solution flowing through a pipe, tube or conduct having a continuous flow therethrough, which comprises adding about 0.001 to about 0.1 weight percent of a betaine copolymer of acrylamide and N-(3 sulfopropyl)-N-methacryol-oxyethyl-N,N-dimethyl-ammonium betaine, wherein the copolymer has the structure:

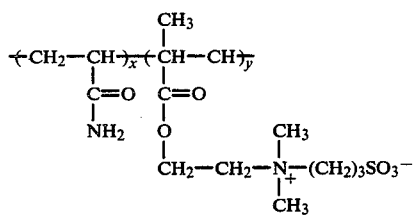

wherein x is about 40 to about 99 mole %, more preferably about 50 to about 90, and most preferably about 60 to about 80 and y is about 1 to about 60 mole %, more preferably about 10 to about 50 and most preferably about 20 to about 40. The number average molecular weight of the betaine copolymers of the instant invention as measured by intrinsic viscosity is about 0.5 million to about 30 million, more preferably about 1 million to about 20 million, and most preferably about 2 million to about 10 million.

The aqueous solution can be water, or preferably an acid, base or brine solution having a concentration of about 0.01 to about 10 wt. % of the acid, brine, or base.

The betaine copolymers are formed by a homogenous copolymerization process which comprises the steps of forming a mixture of sodium dodecyl sulfate, acrylamide and n-(3-sulfopropyl)-N-methacryol-oxyethyl-N,N-dimethyl-ammonia betaine monomer under a nitrogen atmosphere; adding deoxygenated water to said mixture to form a reaction solution; heating said reaction solution to at least 50° C.; adding a free radical initiator to said reaction solution to initiate the copolymerization of the acrylamide monomer and the N-(3-sulfopropyl)-N-methacryol-oxyethyl-N,N-dimethyl-ammonia betaine monomer; polymerizing the monomers at a sufficient temperature and for a sufficient time to form the water soluble copolymer of acrylamide-N-(3-sulfopropyl)-N-methacryol-oxyethyl-N,N-dimethyl-ammonium betaine; and recovering the water soluble copolymer from the reaction solution.

Suitable free radical initiators for the instant free radical-copolymerization process are potassium persulfate; sodium thiosulfate, potassium persulfate mixture; benzoyl peroxide, and other common free radical initiators. The concentration of the free radical initiator is about 0.02 to about 0.50 grams per 100 grams of acrylamide monome and alkyl acrylamide-monomer.

Polymerization of the acrylamide monomer and N-(3-sulfopropyl)-N-methacryol-oxyethyl-N,N-dimethyl-ammonia betaine monomer is effective at a temperature of about 25 to about 90° C., more preferably at about 30 to about 65° C., and most preferably at about 45 to about 55° C. for a period of about 1 to about 48 hours, more preferably at about 2 to about 36, and most preferably at about 4 to about 24.

A suitable method for recovery of the formed copolymer from the reaction solution comprises precipitation into acetone.

DESCRIPTION OF THE PREFERRED EMBODIMENTS

The following examples illustrate the present invention without, however, limiting the same hereto.

EXAMPLE 1

Poly(acrylamide-CO-N-3-sulfopropyl)-N-methacryol-oxyethyl-N,N-dimethyl-ammonium betaine (95/5 mole %)

A two-liter reaction kettle was equipped with an air driven stirrer, water condenser, thermometer and subsurface nitrogen purge. One liter of distilled dionized water was added and heated at 50°-55° C. for one hour while stirring and rapid nitrogen sweep. The nitrogen inlet was raised and the monomers, acrylamide (30 g), and N-(3-sulfopropyl)-N-methacryoloxethyl-N,N-dimethyl ammonium betaine (SPE) (6.1 g.), were added. This corresponds to a 95/5 mole % charge ratio. A 0.023 g. quantity of $K_2S_2O_8$ initiator was charged and the polymerization continued at 52°-54° C. for 19 hours.

EXAMPLE 2

Poly(acylamide-co-N-(3-sulfopropyl)-N-methacroyl-oxyethyl-N,N-dimethyl ammonium betaine) (95/10 mole %)

The method of Example 2 was followed, except that 30 g of acrylamide, 12.8 g of SPE were copolymerized by 0.023 g of $K_2S_2O_8$ for 18.5 hours at 50° to 52° C. (9595-157).

EXAMPLE 3

A 158 (0.211 mole) quantity of acrylamide (AM), and a 25 g (0.09 mol) quantity of N-(3-sulfopropyl)-N-methacryloxyethyl-N,N-dimethyl ammonium betaine (SPE), 70/30 mol ratio of AM/SPE) was polymerized with 0.012 g ($4.4 \times 10^5$ mol) $Y_2S_2O_8$ initiator at 53° C. for 21.5 hours. At the end of the reaction the polymer was precipitated in acetone and dried.

EXAMPLE 4

The polymer prepared in Example 3 was tested as a drag reducing agent in water and various salt concentrations by flowing aqueous polymer solutions through a 2.13 mm inside diameter stainless steel tube and measuring the resulting frictional pressure drop. All solutions in this Example contained 1,000 ppm (by weight) polymer. The solvent was distilled water containing either 0% or 10% NaCl (by weight). Flows were generated by loading a pair of stainless steel tanks (1 liter each) with a previously dissolved aqueous polymer solution, pressurizing the tanks with nitrogen gas (300 KPa), and discharging the solution through the tube test section. Pressure drops were measured across a 50 cm straight segment of the tube with a pair of tube wall pressure taps and a differential pressure transmitter. Flow rates were measured by weighing samples of the effluent liquid collected over measured time periods.

Flow rates in the drag reduction experiments ranged from about 10 to 7 g/s; these corresponded to solvent Reynolds numbers from about 6,500 to 17,500 (solvent Reynolds number = mean flow velocity × tube diameter solvent kinematic viscosity). Drag reduction was measured by comparing pressure drops of the polymer solutions with pressure drops of distilled water at equal flow rates. Results were expressed as percent drag reduction which is defined as follows:

Percent Drag Reduction =

$$\frac{\left(\text{Pressure Drop (Solvent)} - \text{Pressure Drop (Solution)}\right)}{\text{Pressure Drop (Solvent)}} \times 100$$

Typical drag reduction results from experiments with the betaine solutions are given in Table I. Additional data relating measured pressure drops to flow rates are given in FIG. 1.

TABLE I

| Polymer Concentration | Salt Concentration | % Drag Reduction (Flow Rate = 20 g/s) |
|---|---|---|
| 1,000 ppm | none | 24 |
| 1,000 ppm | 10% | 38 |

The data indicate that significant drag reduction was observed for all solutions and that drag reduction effectiveness improved with increasing salt concentrations.

Moreover, our data shows that these polymeric materials are effective drag reducers in fresh water.

What is claimed is:

1. A method for reducing the frictional drag of an aqueous solution flowing through a pipe, tube or conduit having a continuous flow therethrough, which comprises the step of adding about 0.001 to about 0.1 wt. % of a copolymer to said aqueous solution, wherein said copolymer has the structure:

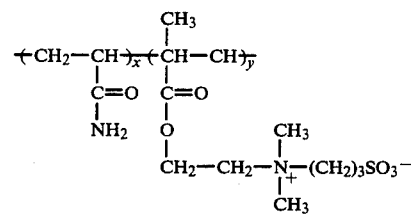

wherein x is about 40 to about 99 mole % and y is about 1 to about 60 mole %

2. A method according to claim 1, wherein such aqueous solution is water.

3. A method according to claim 1, wherein said aqueous solution is an acid, base or brine solution.

* * * * *